(12) United States Patent
Chaudhri

(10) Patent No.: US 7,735,020 B2
(45) Date of Patent: *Jun. 8, 2010

(54) METHOD AND APPARATUS FOR DETERMINING FONT ATTRIBUTES

(75) Inventor: Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 455 days.

This patent is subject to a terminal disclaimer.

(21) Appl. No.: 11/524,623

(22) Filed: Sep. 20, 2006

(65) Prior Publication Data

US 2007/0016874 A1 Jan. 18, 2007

Related U.S. Application Data

(63) Continuation of application No. 10/100,878, filed on Mar. 18, 2002, now Pat. No. 7,117,450.

(60) Provisional application No. 60/364,974, filed on Mar. 15, 2002.

(51) Int. Cl.
*G06F 3/00* (2006.01)

(52) U.S. Cl. .................. 715/787; 715/833; 715/786; 715/784

(58) Field of Classification Search ............... 715/784, 715/786, 787, 833
See application file for complete search history.

(56) References Cited

U.S. PATENT DOCUMENTS

| 4,464,652 A | 8/1984 | Lapson et al. |
| 4,555,775 A | 11/1985 | Pike |

(Continued)

FOREIGN PATENT DOCUMENTS

EP 0483777 5/1992

(Continued)

OTHER PUBLICATIONS

Microsoft Corporation, Microsoft Internet Explorer, 2001, version 6.0.2800.1106CO, 5 pages (Explorer 1-5).

(Continued)

*Primary Examiner*—Dennis Bonshock
(74) *Attorney, Agent, or Firm*—Blakely, Sokoloff, Taylor & Zafman LLP

(57) ABSTRACT

Methods and apparatuses for text formatting. In one exemplary embodiment of the present invention, a method to determine a font attribute includes: determining a first number and a second number; receiving input resulting from a sliding (or other repositioning method) of a thumb of a slider to a position; and determining a value for the font attribute from the position relative to the slider and the first and second numbers. In one example according to this aspect, the font attribute is one of: a) font size; b) boldness; c) italic angle; d) baseline offset; e) line spacing; and f) character spacing. At least one of the first number and the second number is adjusted in one example, when the thumb is pushed against one end of the slider. In another example according to this aspect, at least one of the first number and the second number is updated when a first input is received (e.g., selecting a value from a list, typing in a value; or pushing a thumb against one end of a slider), which determines the at least one of the first and second number.

49 Claims, 8 Drawing Sheets

U.S. PATENT DOCUMENTS

| | | | |
|---|---|---|---|
| 4,653,020 | A | 3/1987 | Cheselka et al. |
| 4,688,167 | A | 8/1987 | Agarwal |
| 4,689,737 | A | 8/1987 | Grant |
| 4,712,191 | A | 12/1987 | Penna |
| RE32,632 | E | 3/1988 | Atkinson |
| 4,769,636 | A | 9/1988 | Iwami et al. |
| 4,780,709 | A | 10/1988 | Randall |
| 4,783,648 | A | 11/1988 | Homma et al. |
| 4,819,189 | A | 4/1989 | Kikuchi et al. |
| 4,831,556 | A | 5/1989 | Oono |
| 4,862,389 | A | 8/1989 | Takagi |
| 4,899,136 | A | 2/1990 | Beard et al. |
| 5,008,853 | A | 4/1991 | Bly et al. |
| 5,040,131 | A | 8/1991 | Torres |
| 5,060,170 | A | 10/1991 | Bourgeois et al. |
| 5,107,443 | A | 4/1992 | Smith et al. |
| 5,140,677 | A | 8/1992 | Fleming et al. |
| 5,140,678 | A | 8/1992 | Torres |
| 5,146,556 | A | 9/1992 | Hullot et al. |
| 5,202,828 | A | 4/1993 | Vertelney et al. |
| 5,293,476 | A | 3/1994 | Wolber et al. |
| 5,305,435 | A | 4/1994 | Bronson |
| 5,313,575 | A | 5/1994 | Beethe |
| 5,325,481 | A | 6/1994 | Hunt |
| 5,343,409 | A | 8/1994 | Satterfield et al. |
| 5,347,628 | A | 9/1994 | Brewer et al. |
| 5,347,678 | A | 9/1994 | Williams et al. |
| 5,371,844 | A | 12/1994 | Andrew et al. |
| 5,384,911 | A | 1/1995 | Bloomfield |
| 5,386,564 | A | 1/1995 | Shearer et al. |
| 5,412,776 | A | 5/1995 | Bloomfield et al. |
| 5,422,993 | A | 6/1995 | Fleming |
| 5,533,180 | A | 7/1996 | Zhou et al. |
| 5,572,647 | A | 11/1996 | Blades |
| 5,579,469 | A | 11/1996 | Pike |
| 5,583,984 | A | 12/1996 | Conrad et al. |
| 5,657,049 | A | 8/1997 | Ludolph et al. |
| 5,680,562 | A | 10/1997 | Conrad et al. |
| 5,714,971 | A | 2/1998 | Shalit et al. |
| 5,721,847 | A | 2/1998 | Johnson |
| 5,737,737 | A | 4/1998 | Hikida et al. |
| 5,745,096 | A | 4/1998 | Ludolph et al. |
| 5,754,174 | A | 5/1998 | Carpenter et al. |
| 5,767,834 | A | 6/1998 | Vouri et al. |
| 5,825,348 | A | 10/1998 | Ludolph et al. |
| 5,883,623 | A | 3/1999 | Cseri |
| 6,061,061 | A | 5/2000 | Conrad et al. |
| 6,147,674 | A | 11/2000 | Rosenberg et al. |
| 6,232,972 | B1 | 5/2001 | Arcuri et al. |
| 6,288,720 | B1 * | 9/2001 | Zimmerman et al. ........ 715/810 |
| 6,300,967 | B1 | 10/2001 | Wagner et al. |
| 6,307,545 | B1 | 10/2001 | Conrad et al. |
| 6,317,739 | B1 | 11/2001 | Hirata et al. |
| 6,448,985 | B1 | 9/2002 | McNally |
| 6,512,531 | B1 * | 1/2003 | Gartland .................... 715/854 |
| 6,538,665 | B2 * | 3/2003 | Crow et al. ................ 715/723 |
| 6,642,944 | B2 | 11/2003 | Conrad et al. |
| 6,734,882 | B1 | 5/2004 | Becker |
| 6,785,676 | B2 | 8/2004 | Oblinger |
| 6,928,621 | B2 | 8/2005 | Conrad et al. |
| 6,957,395 | B1 | 10/2005 | Jobs et al. |
| 7,080,324 | B1 | 7/2006 | Nelson et al. |
| 7,103,851 | B1 * | 9/2006 | Jaeger ........................ 715/786 |
| 7,549,126 | B2 | 6/2009 | Conrad et al. |
| 2002/0149619 | A1 | 10/2002 | Sauer |

FOREIGN PATENT DOCUMENTS

| | | |
|---|---|---|
| EP | 0514307 A3 | 11/1992 |
| FR | 2693810 | 1/1994 |
| WO | WO 89/11694 | 11/1989 |

OTHER PUBLICATIONS

Screen Dumps, Internet Explorer, version 5.0, software released in 1999, 2 pages.

"Microsoft Windows™ User Guide", Microsoft Corporation, 1985-1990 Version 3.0, p. 97.

"Microsoft Windows Program Manager," Screen Dumps from Microsoft Windows™ v3.1, Miscrosoft Corporation 1985-1992, pp. 1-14.

"Automatic Window Management Mode", IBM Technical Disclosure Bulletin, vol. 35, No. 4B, p. 331 Sep. 1992.

"Developer's Desktop," IBM Tech. Disclosure, vol. 33, No. 6B, Nov. 1990, pp. 114-117.

"Notebook Tabs as Target Location for Drag/Drop Operations", IBM Technical Disclosure Bulletin, vol. 35, No. 7, Dec. 1992, p. 207.

"Preliminary Research Report," No. 9206603000, INPI, Feb. 2, 1996.

"Using Desk Top and Drawers to Predefine Paths," Research Disclosure, No. 312, Apr. 1990, p. 298.

"Virtual Office Desktop Drawers," Research Disclosure, No. 305, Sep. 1989, p. 651.

Apple Computer, "Inside Macintosh", Apple Technical Library, Chapter 6, Dec. 1992, pp. 107-130.

Cowart, Robert. Mastering Windows 3.1. Sybex Inc., 1992, pp. 7-30, 52-57 and 149-162.

Duntemann, Jeff, "Complete Turbo Pascal", Scott, Foresman and Company, Third Edition, pp. 528-548, 1989.

Johnson, Jeff et al., "The Xerox Star: A Retrospective", Computer, Sep. 1989, vol. 22, No. 9, pp. 11-28.

Johnston, R., "Window Shade Version 1.1 Program", Interactive Technologies, Inc., Stuart, Florida, 1989, 2 pages.

Lam et al., "The NewWave Office," Hewlett-Packard Journal, Aug. 1990, vol. 40, No. 4, p. 23-31.

Mander, Richard et al., "A 'Pile' Metaphor for Supporting Casual Organization of Information", ACM Conference on Human Factors in Computing Systems (CHI '92 Conference Proceedings): Striking a Balance (May 3-7, 1992), pp. 627-634 Monterey (US).

Myers, Brad A, "Window Interfaces, A Taxonomy of Window Manager User Interfaces", IEEE Computer Graphics and Applications, Sep. 1988, pp. 65-83.

The NeXT™ "User's Reference Manual," c1989 by NeXT™, Inc., pp. 10-12, 99-102.

Tyne, Maria E. "Thinking Person's Guide to OS.2 2.1," John Wiley & Sons Inc., 1993, pp. 5-12 1993.

* cited by examiner

METHOD AND APPARATUS FOR DETERMINING FONT ATTRIBUTES

This application is a continuation of U.S. patent application Ser. No. 10/100,878, filed on Mar. 18, 2002 now U.S. Pat. No. 7,117,450. This application also claims the benefit of the filing date of U.S. Provisional Application No. 60/364,974, filed on Mar. 15, 2002, and entitled "Method and Apparatus for Determining Font Attributes" by the inventor Imran Chaudhri.

FIELD OF THE INVENTION

The invention relates to Graphical User Interfaces (GUI), and more particularly to a GUI for determining font attributes.

BACKGROUND OF THE INVENTION

Many software applications (e.g., a word processor, a drawing application, or others) can be used to manipulate text information. Graphical User Interfaces (GUI) help users to select various parameters in formatting text. Typically, a font panel or a text format tool bar is provided by a software application so that a user can interactively select or specify font attributes (e.g., font size, line spacing) in formatting text.

FIGS. 2-3 show a prior art method to adjust font attributes. In FIG. 2, font panel 200 is a movable window with title bar 201 and main panel 203. The main panel contains a number of standard GUI components, such as pop-up menu 205, combination box 209, option list 211 with checkboxes 221-223, and push buttons 231-233. Pop-up menu 205, when activated (e.g., by selecting with cursor, pointing the cursor at the menu and pressing a button such as a mouse's button, or by using a shortcut key, or by other means), shows a list of available fonts in a pop-up window, from which a user can select one by a conventional point and click method. Combination box (or combo box) 209 allows a user to type in a value to specify the size for the selected font, or activating a pop-up menu to select one value from a list of predetermined options. Checkboxes 221-223 are provide for the user to select a font style (e.g., bold, italic, underline, or combinations of bold, italic and underline). Once the user is satisfied with the selection, push button 231 can be pressed to apply the new values to the corresponding font attributes; or push button 232 can be pressed to apply the new values and dismiss the font panel; or push button 233 can be pressed to discard the selection and dismiss the font panel.

Once arrow 207 of combo box 209 is pressed by cursor 301 (e.g., clicking a button of a mouse while the cursor is on the arrow), pop-up window 303 appears, as shown in FIG. 3. A user can then point the cursor to a desired font size on the list and click on it to select the size. The predetermined list in pop-up window 303 provides a limited choice. When a desired font size is not available from the list, a user must type in the size in combo box 209.

While these methods provide convenient interfaces for selecting parameters to format text, more user friendly and effective methods are desirable, since formatting text is a frequently performed task for many, many users.

SUMMARY OF THE DESCRIPTION

Methods and apparatuses for text formatting are described here.

In one aspect of the present invention, a method to determine a font attribute includes: determining a first number and a second number; receiving input resulting from a sliding of a thumb of a slider to a position; and determining a value for the font attribute from the position relative to the slider and the first and second numbers. In one example according to this aspect, the font attribute is one of: a) font size; b) boldness; c) italic angle; d) baseline offset; e) line spacing; and f) character spacing. At least one of the first number and the second number is adjusted in one exemplary embodiment, when the thumb is pushed against one end of the slider. In another example according to this aspect, at least one of the first number and the second number is updated when a first input is received (e.g., selecting a value from a list, typing in a value; or pushing a thumb against one end of a slider), which determines the at least one of the first and second number. When an input for switching from a first mode to a second mode is received, the slider is replaced with a representation of a command (e.g., a combination box, a pop-up menu, a selection list, or others), which when activated allows selection of a value from a list (or entry of text in a text field).

The present invention includes apparatuses which perform these methods, including data processing systems which perform these methods and machine or computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
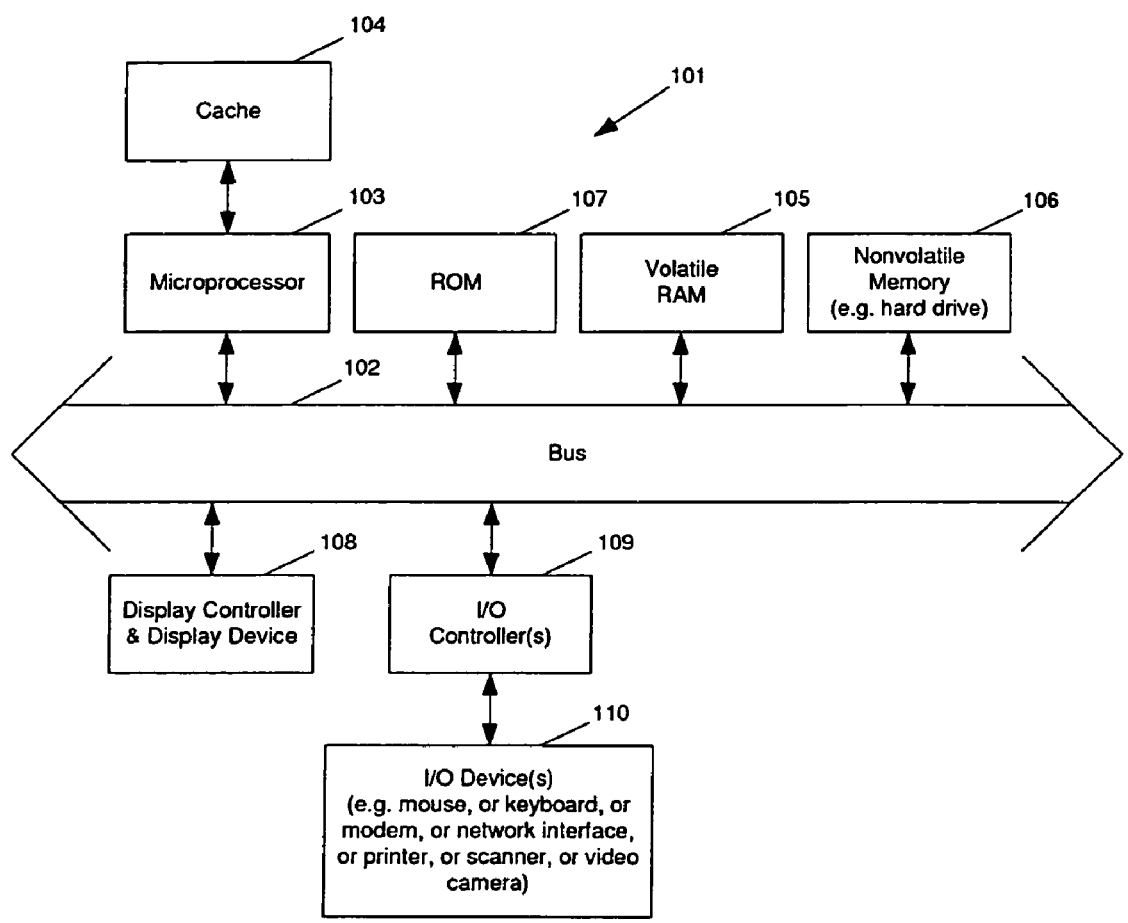
FIG. 1 shows a block diagram example of a data processing system which may be used with the present invention.
Figure 2:
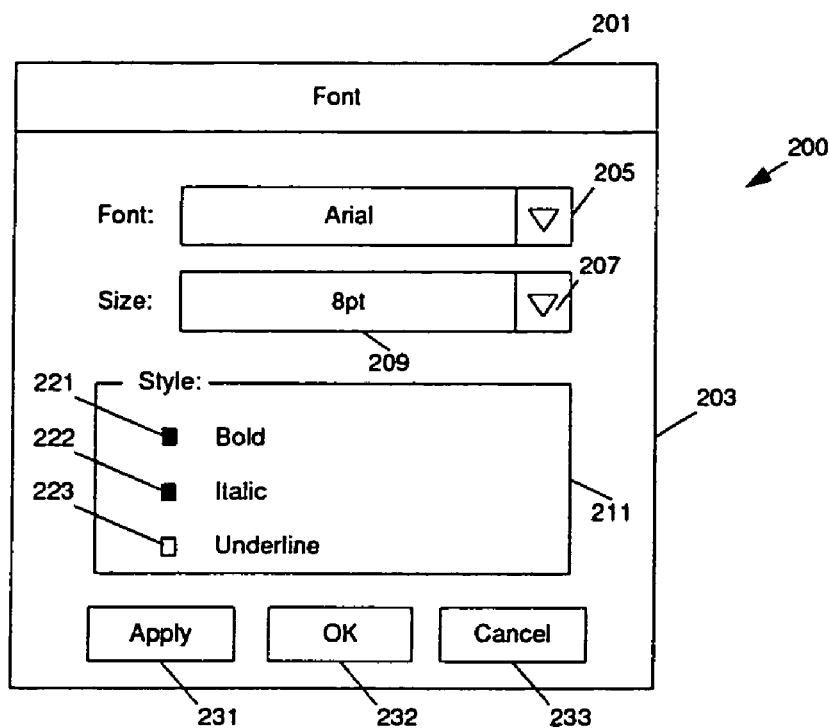
FIGS. 2-3 show a prior art method to adjust font attributes.
Figure 3:
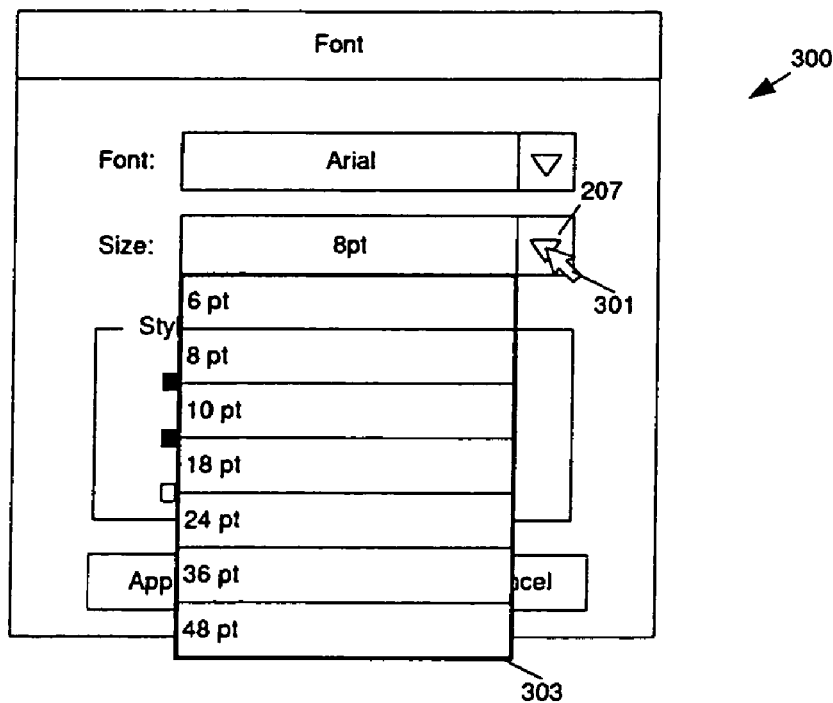
Figure 4:
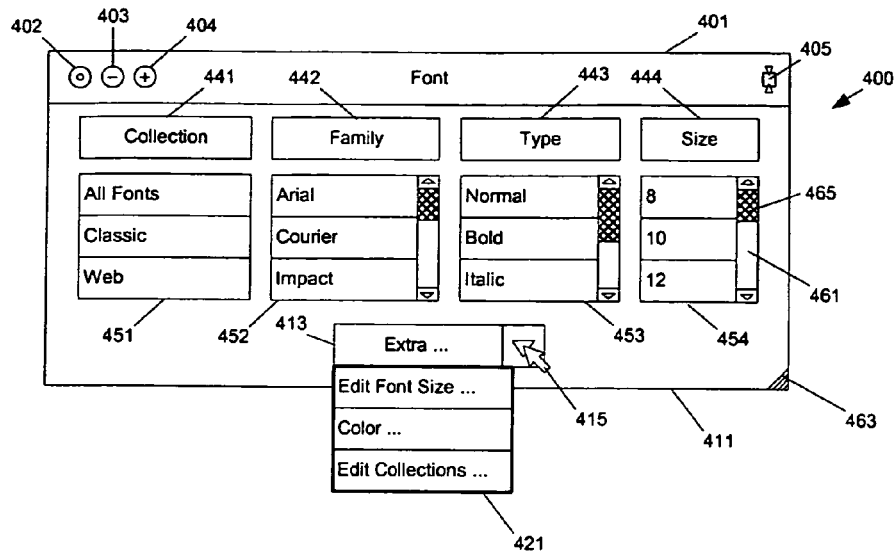
FIGS. 4-7 show examples of methods to adjust font attributes according to one embodiment of the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

At least one embodiment of the present invention seeks to utilize sliders to set various font attributes for formatting text.

FIGS. 4-7 show examples of methods to adjust font attributes according to one embodiment of the present invention. Window 400 in FIG. 4 contains title bar 401 and main panel 411. Title bar 401 contains in one exemplary embodiment icon buttons 402, 403 and 404 for closing the window, minimizing the window, and maximizing the window. Main panel 411 contains labels 441-444, showing the font attributes that can be changed using the selection lists below them. Selection lists 451-454 shows available options for the corresponding font attributes. Some of the option lists (e.g., list 452, 453, or 454) contain more items than that can be simultaneously made visible in the corresponding display areas. Thus, the scroll bar (e.g., scroll bar 461) is provided so that a user can scroll to see different parts of the list in the displayed area (e.g., 454). For example, a user may pull down thumb 465 to reveal available font sizes other than those currently displayed in area 454. The user may pull down thumb 465 by, for example, placing a cursor over the thumb, selecting the thumb (by pressing down on a mouse button while the cursor is over the thumb) and "dragging" the thumb down (by moving the mouse while keeping the mouse button pressed). The size of selected text may be changed dynamically and interactively when the user repositions thumb 465. Thus the user can see the result, on the selected text, of changing the position of the thumb as the user causes the thumb to be moved. Note that such scrollable list may be scrolled by means other than a scroll bar. For example, a scrollable list may be scrolled by arrow icons, or by arrow keys, or by placing a cursor near the boundary of the display area.

Figure 5:
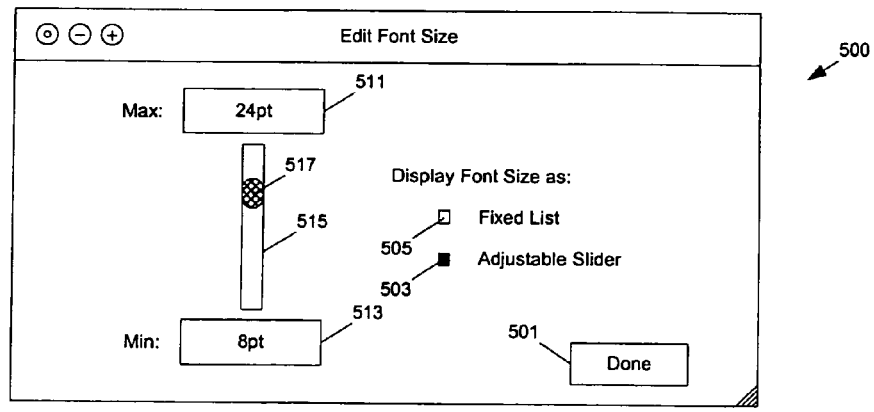

Pop-down menu 413, when activated by cursor 415, brings up menu list 421 for further options. When menu item "Edit Font Size . . . " is selected, dialog window 500 as shown in FIG. 5 appears.

Window 500 contains radio buttons 503 and 505 for selecting whether to display the font size options as a fixed list (505) or an adjustable slider (503). When radio button 503 is pressed, the font size option is displayed as slider 515. Text entries 511 and 513 show the maximum and minimum font sizes corresponding to the sizes selected when the thumb 517 is at the top and the bottom of slider 515 respectively. A user can type in customized limits for the maximum and minimum font sizes in text entries 511 and 513. Alternatively, combo boxes can be used in the places of text entries 511 and 513 so that a user can simply select customized limits from predetermined lists. In another embodiment of the present invention, the maximum and minimum font size can be changed by pressing thumb 517 against one end of the slider. More details on this aspect are described below with FIGS. 10 and 11. When thumb 517 is moved to one position on slider 515, a selected font sized is computed from the position. In one embodiment of the present invention, a linear interpolation is used to determine the selected font size from the position of the thumb relative to the ends of the slider using the maximum and minimum font sizes, which correspond to the font sizes when the thumb is at the ends of the slider. In another embodiment of the present invention, the maximum and minimum sizes determine a list of option values; and the position of thumb 517 is used to select one from the list. When the user uses the maximum and the minimum to define a smaller range of font size, the selected font size changes smoothly as the thumb moves; when the user uses the maximum and minimum to define a larger range of font size, the slider can provide size options in a wider range with a lower resolution.

When the user is satisfied with the setting, push button 501 can be pressed to activate the setting and dismiss window 500. Since option 503 is selected to display font size as an adjustable slider, window 400 in FIG. 4 becomes window 600 in FIG. 6. Font size selection list 454 is converted into font size selection slider 603. Text entry 601 displays the currently selected font size, as determined from the position of thumb 605 and the maximum and minimum sizes specified previously in text entries 511 and 513 (in FIG. 5). Note that, a combo box (which includes a list of selectable items and a text entry field into which a user may enter text) may be used in the place of text entry 601 to allow a user to select from a pop-up menu; or, a label may be used in the place of text entry 601 to prevent the user from typing in a value.

Figure 6:
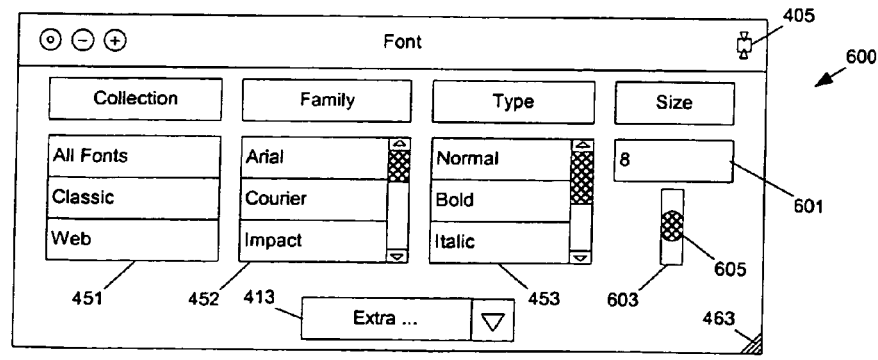
Figure 7:
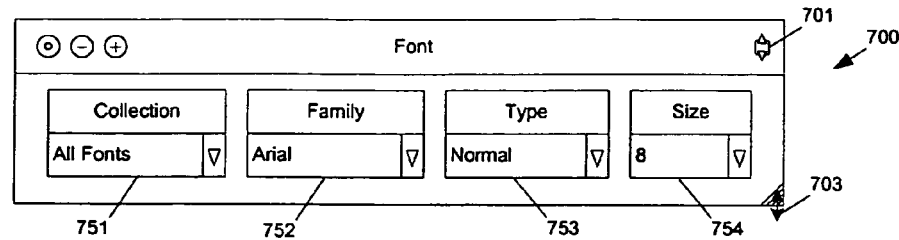

Corner 463 of window 600 in FIG. 6 (or corner 463 of window 400 in FIG. 4) can be dragged by a cursor to resize the window. When window 600 (or window 400) is enlarged, larger display areas are available to the selections lists (e.g., lists 451, 452, and 454) and slider 603. Thus, more options can be shown in the displayed area simultaneously. Since the slider is longer, it is easier to control the movement of thumb 605. When window 600 (or window 400) is reduced to a smaller height, the selection list and the slider can be resized to use smaller display areas. When the height of the window is smaller than a predetermined value, selection lists (e.g., lists 451-453) and the slider are not effective in displaying options. Thus, they can be converted into pop-up menus and a combo box, as shown in FIG. 7. Alternatively, a button (e.g., icon button 405) can be used to switch from window 600 in a normal mode to window 700 in a mini mode in FIG. 7. Similarly, an optional button 701 on window 700 in FIG. 7 can be pressed to switching window 700 in the mini mode back to window 600 in the normal mode; or, cursor 703 can drag the corner of window 700 to enlarge the window to the normal mode.

Window 700 in FIG. 7 has pop-up menus 751-753 for accessing selection lists 451-453. When activated, combo box 754 can bring up a scrollable selection list in a popup window, or a slider in a dialog window (e.g., window 500 or 800).

Figure 8:
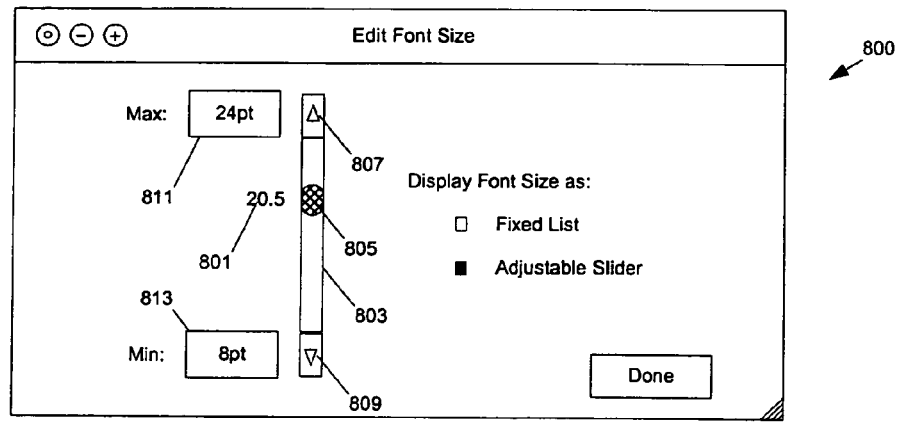
FIGS. 8-9 show alternative methods to adjust font attributes according to alternative embodiments of the present invention.
Figure 9:
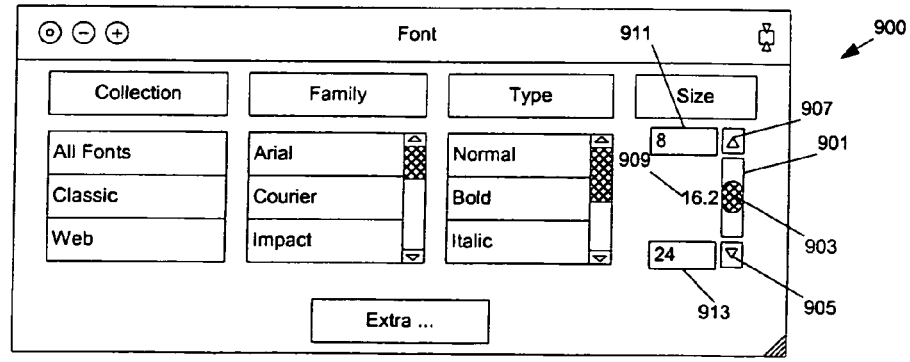

FIGS. 8-9 show alternative methods to adjust font attributes according to alternative embodiments of the present invention. In addition to slider 803, window 800 in FIG. 8 contains arrows 807 and 809. Arrows 807 and 809 are used to scroll thumb 805 in the directions of the arrows. In one embodiment of the present invention, small changes of predetermined amount can be applied to the current selected value by clicking the arrows, providing a way to fine tune the selected value. Label 801 follows the movement of thumb 805 to display the current selected value.

Similarly, window 900 in FIG. 9 shows both the maximum and minimum values in text entries 913 and 911. Slider 901 and scroll arrows 907 and 905 are provided for selecting a value. The position of thumb 903 of slider 901 and the maximum and minimum values, as shown in text entries 911 and 913, determine the current value of the font size.

Figure 10:
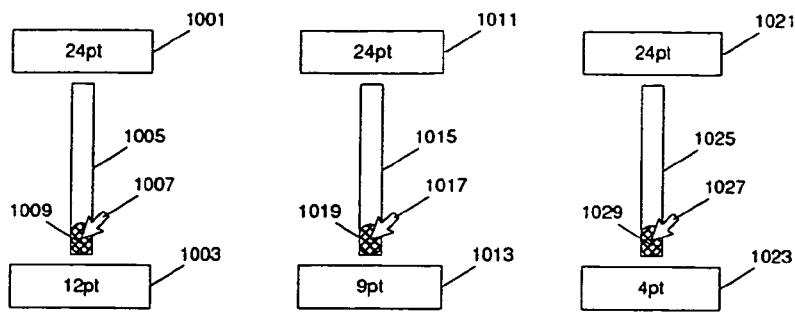
FIGS. 10-11 show methods to set maximum and minimum values for a slider in one embodiment of the invention.
Figure 11:
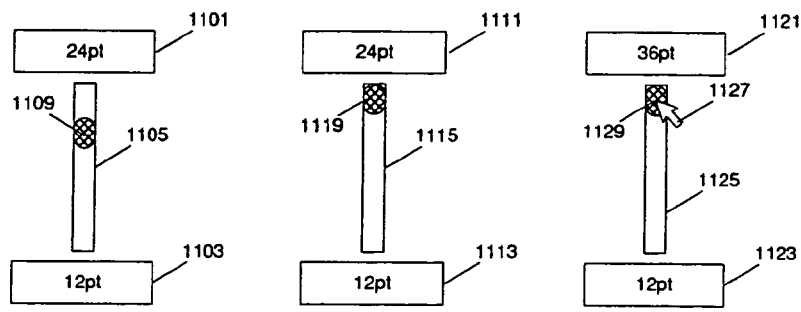

FIGS. 10-11 show methods, which may be used in some embodiments, to set maximum and minimum values for a slider. FIG. 10 shows examples of adjusting the minimum value using the thumb of a slider. When thumb 1009 is pressed against the lower end of slider 1005 by cursor 1007 (e.g., attempting to pull thumb below the lower end of the slider, or pressing down and holding one button of a mouse when the cursor is on the thumb and the thumb is at the lower end of the slider), the minimum value of the slider starts to decrease, as shown in entry 1013. When cursor 1017 continues to press thumb 1019 against the lower end of slider 1015, the minimum value continues to decrease, at shown in entry 1023. In one embodiment of the present invention, the minimum value pushed to by the thumb can be brought back to a predetermined value by some input, such as "double clicking", on the thumb, while the thumb is at the lower end of the slider. For example, after cursor 1027 double clicks (e.g., rapidly pressing a mouse's button twice in succession) thumb 1029 while thumb 1029 is at the lower end of the slider, the minimum value in entry 1023 is brought back to the default value in entry 1003. An alternative input, such as a keystroke (e.g., "d" for default) may be used to restore the default value. In one embodiment of the present invention, when the thumb is pressed against the lower end of the slider to reduce the minimum value, the maximum value is not changed, as shown by entries 1001, 1011, and 1021. In anther embodiment of the present invention, when the thumb is pressed against the lower end of the slider, the slider adjusts the maximum value automatically to avoid an excessively large size range. When the size range is limited, the selected value changes smoothly when the position of the thumb changes, which makes it easier to select a desirable value.

Similarly, FIG. 11 shows examples of adjusting the maximum value of a slider using the thumb of the slider. When thumb 1109 is moved between the upper and lower ends of slider 1105, the maximum and the minimum values in entries 1101 and 1103 are not changed. When thumb 1119 is moved to the upper end of slider 1115, the maximum and the minimum values remain the same. When the thumb is pressed against the upper end of the slider, the maximum value increases, as shown in entry 1121. To avoid an accidental change in the maximum value, it may be required that the thumb presses the upper end "hard" enough to start a change (e.g., pressing longer than a threshold time, or moving a mouse for a significant distance while pressing the upper end). Similar to adjusting the minimum value, the pushed-up value may be relaxed by an input (e.g., double clicking) to the thumb; and, the minimum value may be automatically adjusted to limit the range when the maximum value is pushed up.

Figure 12:
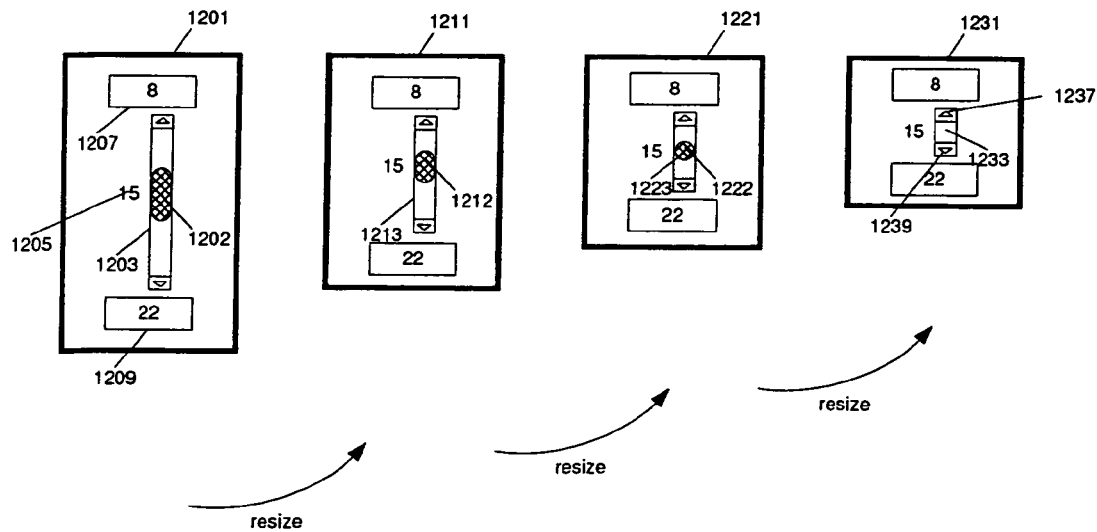
FIG. 12 shows an example of scaling a slider according to one embodiment of the present invention.

FIG. 12 shows an example of scaling a slider according to one embodiment of the present invention. View 1201 displays labels (or text entries) 1207 and 1209, slider 1203. The value displayed in label 1207 (or 1209) corresponds to the minimum (or the maximum) value for the slider when the thumb is at the top (or the bottom) position of the slider. From the position of thumb 1202 and the maximum and minimum values displayed on labels 1207 and 1209, the slider determines the current value for display on label 1205. Thumb 1202 can be pulled along slider 1203 to change the current value. When view 1201 is resized to view 1211, slider 1213 and thumb 1212 are resized so that all components are visible within view 1211. When view 1211 is further resized to view 1221, the sizes of slider 1223 and thumb 1222 are further reduced. When view 1221 is further resized to view 1231, the size of slider 1233 is reduced; and no thumb is visible. In view 1231 (as well as in views 1201, 1211, 1221), scroll arrows (1237 and 1239) can be use to scroll and to select a value.

Figure 13:
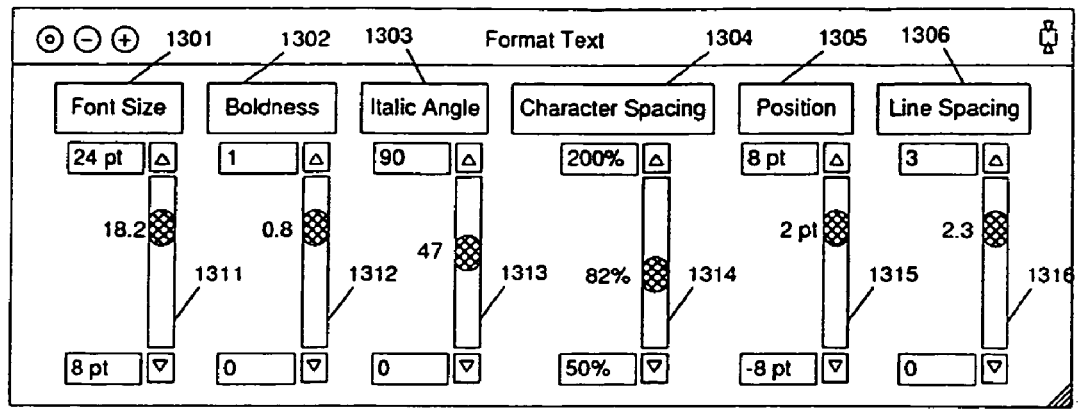
FIGS. 13-14 show methods to format text according to embodiments of the present invention.
Figure 14:
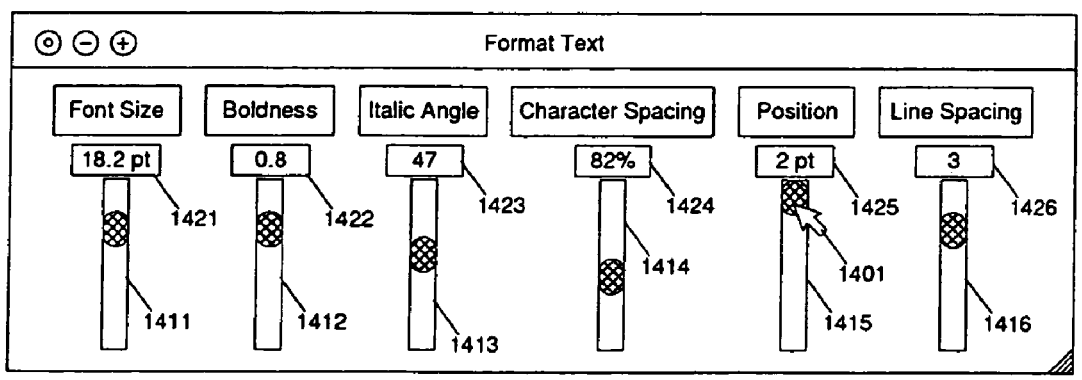

FIGS. 13-14 show methods to format text according to embodiments of the present invention. FIG. 13 shows a format window containing sliders 1311-1316 for adjusting font size, boldness, italic angle, character spacing, position (baseline offset) and line spacing, as indicated by the corresponding labels 1301-1306. Character spacing (inter-item spacing) may be adjusted according to a percentage of a normal spacing (or according to a fixed dimension). Similarly, line spacing may be adjusted according to a percentage of a normal spacing, or according to a specified dimension. The baseline of a character may be increased to raise the character to a superscript position or higher, or be decreased to lower it to a subscript position or lower. Further, a slider may be used to push one or more characters forward or backward from a normal position to form special effects. In one embodiment of the present invention, a user can interactively and dynamically change a font attribute (e.g., font size, boldness, italic angle, line spacing, baseline offset, character spacing) of selected text using a slider.

FIG. 14 shows another type of slider for a format window according to one embodiment of the present invention. Text entries (or combo boxes) 1421-1426 are used to receive type-in values and to display the currently selected values. Sliders 1411-1416 can be used to adjust the font attributes by moving the corresponding thumbs. Further, the maximum and minimum values of the sliders can be changed accordingly when the thumbs are pressed against the ends of the sliders, as described above with FIGS. 10-11.

Figure 15:
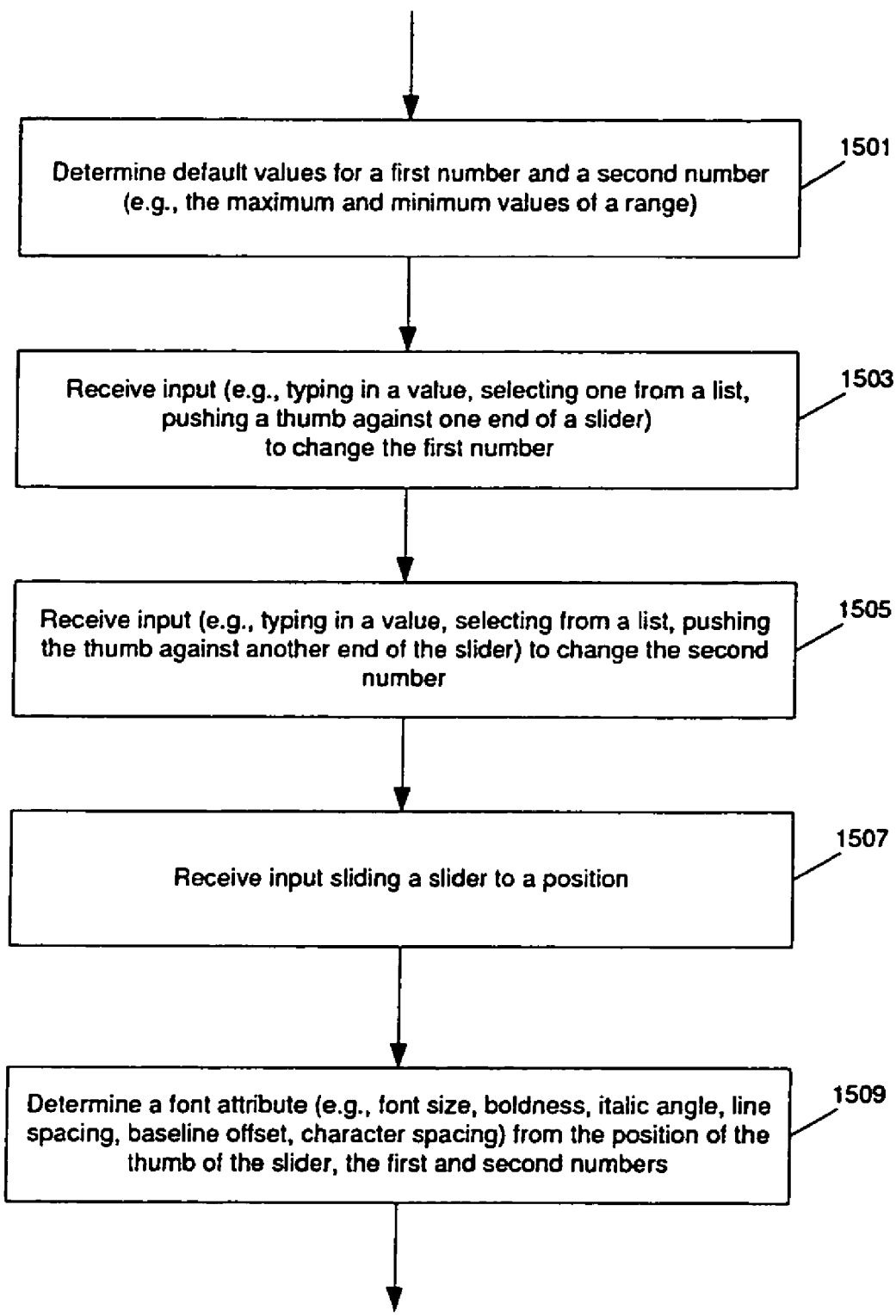
FIG. 15 shows a flow chart of a method to adjust font attributes according to one embodiment of the present invention.

FIG. 15 shows a flow chart of a method to adjust font attributes according to one embodiment of the present invention. Operation 1501 determines default values for a first number and a second number (e.g., the maximum and minimum values of a range). Operation 1503 receives input (e.g., typing a value, selecting one from a list, pushing a thumb against one end of a slider) to change the first number. Operation 1505 receives input (e.g., typing a value, selecting one from a list, pushing a thumb against one end of a slider) to change the second number. Operation 1507 receives input resulting from sliding a thumb of a slider to a position; and operation 1509 determines a font attribute (e.g., font size, boldness, italic angle, line spacing, baseline offset, character spacing) from the position of the thumb of the slider and the first and second numbers.

Figure 16:
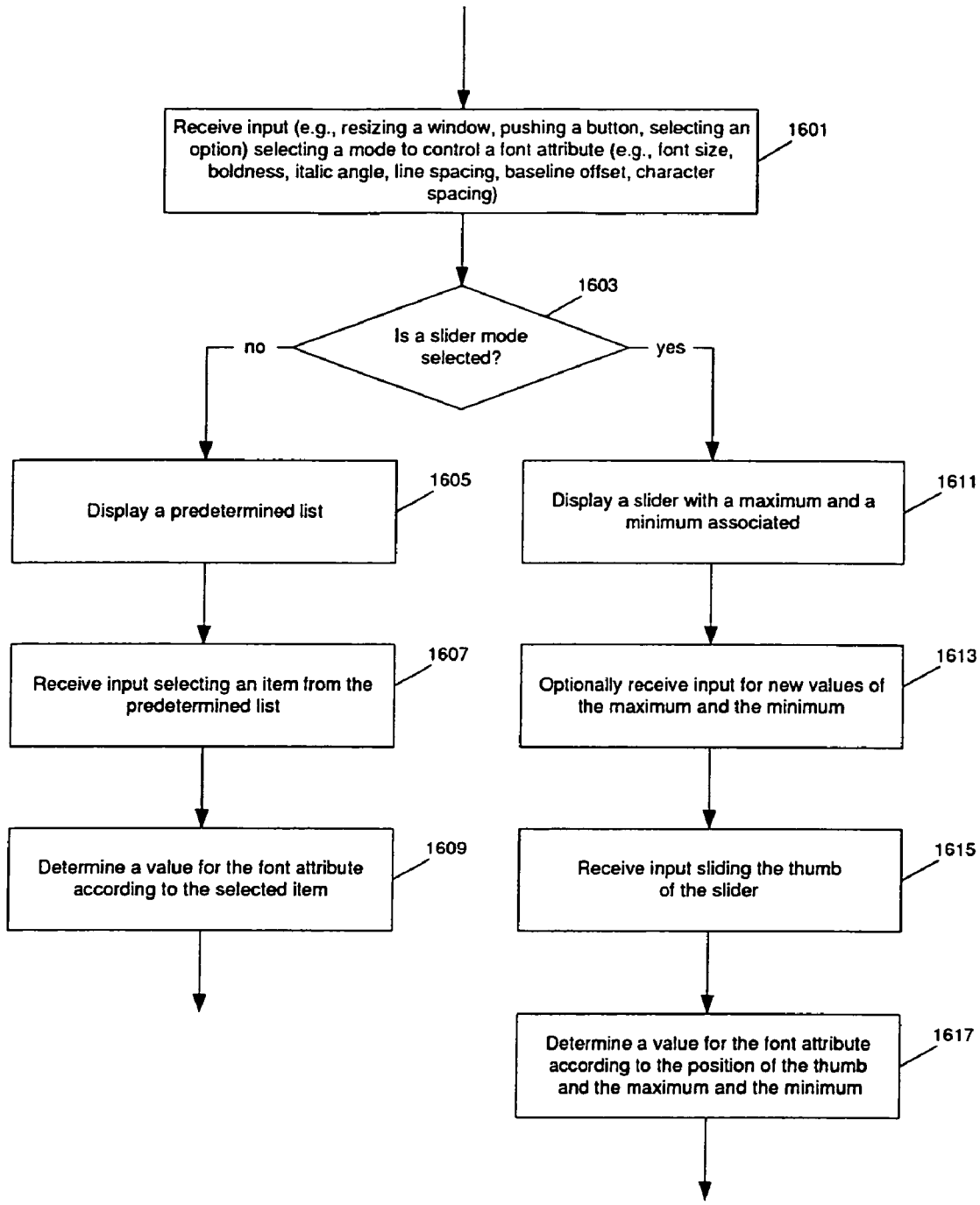
FIG. 16 shows a detailed flow chart of a method to adjust font attributes according to one embodiment of the present invention.

FIG. 16 shows a detailed flow chart of a method to adjust font attributes according to one embodiment of the present invention. Operation 1601 receives input (e.g., resizing a window, pushing a button, selecting an option) selecting a mode to control a font attribute (e.g., font size, boldness, italic angle, line spacing, baseline offset, character spacing). When operation 1603 determines that a slider mode is selected, operation 1611 displays a slider with a maximum and minimum associated with the slider. Optionally, operation 1613 receives input for new values for the maximum and the minimum. After operation 1615 receives input resulting from a sliding of the thumb of the slider, operation 1617 determines a value for the font attribute according to the position of the thumb and the maximum and the minimum. When operation 1603 determines that a slider mode is not selected, operation 1605 displays a predetermined list. After operation 1607 receives input selecting an item from the predetermined list, operation 1609 determines a value for the font attribute according to the selected item. It will be appreciated that sliding the movable thumb (e.g., by dragging the thumb) along the slider control is one of several different ways of repositioning the thumb (sometimes also referred to as a scroller) along the line of the slider control. Other ways to reposition the thumb include pressing at least one key (e.g., the up or down arrow key) on a keyboard or selecting, with a cursor and a mouse button, a position along the linear region. These alternative ways to reposition the thumb may be used instead of, or in addition to, the sliding of operation 1615 or 1507 and may be used with the various different embodiments shown and described herein. It will also be understood that dragging the thumb involves positioning a cursor (e.g., through a mouse) over (or near) the thumb and selecting the thumb (pressing a button such as a mouse's button while the cursor is over the thumb to select the thumb) and maintaining the selection (e.g., by keeping the button pressed) while moving the cursor to thereby cause the thumb to move (usually with the cursor) along the slider's line. The thumb may also be moved by selecting a position on the slider's line; this may involve pointing the cursor to a new position on the line and pressing a button (e.g., a mouse's button), thereby causing the thumb to move to the new position.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method to determine a parameter, the method comprising:

displaying a user interface in a first mode in which a representation of a command is displayed, the representation of the command, when activated, causing the display of a list from which a parameter is selected;

receiving an input to switch from either the first mode to a second mode or to switch from the second mode to the first mode;

displaying a user interface in a second mode in which a slider replaces the list displayed in the first mode, wherein the slider is displayed with a unitary thumb having a position along the slider between a maximum and a minimum parameter, the thumb being movable relative to the slider in response to a user input, at least one of the maximum and the minimum parameter is adjusted when the thumb is pushed against one end of the slider and the position of the thumb determining a selection of a parameter from the list and displaying a label corresponding to the minimum or the maximum value for the slider.

2. The method as in claim 1 wherein the input to switch comprises resizing a window.

3. The method as in claim 1 wherein the list further comprises one of a font attribute.

4. The method as in claim 3 wherein the font attribute is one of: font size, boldness, italic angle, baseline offset, line spacing and character spacing.

5. The method as in claim 1 wherein the representation of the command is one of: a combination box, a pop-up menu, and a selection list.

6. A machine readable medium containing executable computer program instructions which when executed by a data processing system cause the system to perform a method comprising:

displaying a user interface in a first mode in which a representation of a command is displayed, the representation of the command, when activated, causing the display of a list from which a parameter is selected;

receiving an input to switch from either the first mode to a second mode or to switch from the second mode to the first mode;

displaying a user interface in a second mode in which a slider replaces the list displayed in the first mode, wherein the slider is displayed with a unitary thumb having a position along the slider between a maximum and a minimum parameter, the thumb being movable relative to the slider in response to a user input, at least one of the maximum and the minimum parameter is adjusted when the thumb is pushed against one end of the slider and the position of the thumb determining a selection of a parameter from the list and displaying a label corresponding to the minimum or the maximum value for the slider.

7. The medium as in claim 6 wherein the input to switch comprises resizing a window.

8. The medium as in claim 6 wherein the list further comprises one of a font attribute.

9. The medium as in claim 8 wherein the font attribute is one of: font size, boldness, italic angle, baseline offset, line spacing and character spacing.

10. The medium as in claim 6 wherein the representation of the command is one of: a combination box, a pop-up menu, and a selection list.

11. A method for switching a device from a first mode to a second mode, the method comprising:
displaying multiple lists of parameters that are independent of each other;
receiving input to switch from the first mode to the second mode or to switch from the second mode to the first mode for one of the multiple lists of parameters;
replacing, in response to the receiving of the input, the first mode comprising a representation of a command which when activated causes the display of a list which allows selection of a value in the one of the multiple lists of parameters, with a second mode comprising a slider displaying a unitary thumb at a position along the slider that replaces the list displayed in the first mode;
determining a maximum value and a minimum value of the one of the multiple lists of parameters for the slider in response to a user input;
receiving a sliding input of the thumb of the slider to a position along the slider between the maximum and the minimum value of the one of the multiple lists of parameters, wherein the position of the thumb selects a value for the one of the multiple lists of parameters; and
displaying a label corresponding to the minimum or the maximum value for the slider and wherein the device is either in the first mode or the second mode.

12. The method as in claim 11 further comprising:
selecting one of the multiple lists of parameters, when a list of parameters is selected, an intermediate mode is displayed; the intermediate mode further comprising,
a slider with a thumb positioned along the slider with a maximum value of the list of parameters on one end of the slider and a minimum value of the list of parameters on another end, and
a mode selector to the first mode or the second mode, and selecting one of the first mode or the second mode.

13. The method as in claim 11 further comprising resizing a window.

14. The method as in claim 11 wherein the list of parameters further comprises a font attribute.

15. The method as in claim 14 wherein the font attribute comprises one of: font size, boldness, italic angle, baseline offset, line spacing and character spacing.

16. The method as in claim 11 wherein the representation of the command comprises one of: a combination box, a pop-up menu, and a selection list.

17. A machine readable medium containing executable computer program instructions which when executed by a digital processing system cause the system to perform a method to determine a parameter, the method comprising:
displaying multiple lists of parameters that are independent of each other;
receiving input to switch from a first mode to a second mode or to switch from the second mode to the first mode for one of the multiple lists of parameters;
replacing, in response to the receiving of the input, the first mode comprising a representation of a command which when activated causes the display of a list which allows selection of a value in the one of the multiple lists of parameters, with a second mode comprising a slider displaying a unitary thumb at a position along the slider that replaces, the list displayed in the first mode;
determining a maximum value and a minimum value of the one of the multiple lists of parameters for the slider in response to a user input;
receiving a sliding input of the thumb of the slider to a position along the slider between the maximum and the minimum value of the one of the multiple lists of parameters, wherein the position of the thumb selects a value for the one of the multiple lists of parameters; and
displaying a label corresponding to the minimum or the maximum value for the slider.

18. The machine readable medium as in claim 17 further comprising:
selecting one of the multiple lists of parameters, when a list of parameters is selected, an intermediate mode is displayed; the intermediate mode further comprising,
a slider with a thumb positioned along the slider with a maximum value of the list of parameters on one end of the slider and a minimum value of the list of parameters on another end, and
a mode selector to the first mode or the second mode, and selecting one of the first mode or the second mode.

19. The machine readable medium as in claim 17 further comprising resizing a window.

20. The machine readable medium as in claim 17 wherein the list of parameters further comprises one of a font attribute.

21. The machine readable medium as in claim 20 wherein the font attribute comprises one of: font size, boldness, italic angle, baseline offset, line spacing and character spacing.

22. The machine readable medium as in claim 17 wherein the representation of the command comprises one of: a combination box, a pop-up menu, and a selection list.

23. A method performed by a digital processing system to determine a parameter, the method comprising:
displaying multiple lists of parameters that are independent of each other;
receiving input to switch from a first mode to a second mode or to switch from the second mode to the first mode for one of the multiple lists of parameters;
replacing, in response to the receiving of the input, the first mode comprising a representation of a command which when activated causes the display of a list which allows selection of a value in the one of the multiple lists of parameters, with a second mode comprising a slider displaying a unitary thumb at a position along the slider that replaces the list displayed in the first mode;
determining a maximum value and a minimum value of the one of the multiple lists of parameters for the slider in response to a user input;
receiving a sliding input of the thumb of the slider to a position along the slider between the maximum and the minimum value of the one of the multiple lists of parameters, wherein the position of the thumb selects a value for the one of the multiple lists of parameters; and
displaying a label corresponding to the minimum or the maximum value for the slider.

24. The method as in claim 23 further comprising:
selecting one of the multiple lists of parameters, when a list of parameters is selected, an intermediate mode is displayed; the intermediate mode further comprising,
a slider with a thumb positioned along the slider with a maximum value of the list of parameters on one end of the slider and a minimum value of the list of parameters on another end, and
a mode selector to the first mode or the second mode, and selecting one of the first mode or the second mode.

25. The method as in claim 23 further comprising resizing a window.

26. The method as in claim 23 wherein the list of parameters further comprises one of a font attribute.

27. The method as in claim 26 wherein the font attribute comprises one of: font size, boldness, italic angle, baseline offset, line spacing and character spacing.

28. The method as in claim 23 wherein the representation of the command comprises one of: a combination box, a pop-up menu, and a selection list.

29. A user interface for determining an attribute, the user interface comprising:
    a display, displaying multiple attributes wherein a mode of the user interface for each attribute can be selected independently of others;
    at least two modes in which to allow a user to determine a value in a selected attribute, where each mode is capable of switching to another in response to a user input, the at least two modes comprising:
    a first mode of the user interface which includes a representation of a command which when activated causes the display of a list which allows selection of a value from the list for the selected attribute;
    a second mode of the user interface which includes a slider control that replaces the list displayed on the display in the first mode, the slider control having:
        a first end which corresponds to a minimum value,
        a second end which corresponds to a maximum value,
        a linear region disposed between the first end and the second end,
        a moveable unitary thumb disposed along the linear region wherein the value for the attribute from the list is determined from the position of the moveable thumb relative to the first and the second ends, and
        a label corresponding to the minimum or the maximum value for the slider, wherein the minimum and the maximum values of the list of values are determined in response to a user input.

30. The user interface as in claim 29 wherein the user input comprises:
    selecting one of the multiple attributes, when the attribute is selected, an intermediate mode is displayed; the intermediate mode further comprising
        a slider with a thumb positioned along the slider with a maximum value of the attribute on one end of the slider and a minimum value of the attribute on another end, and
        a mode selector to the first mode or the second mode; and
    selecting one of the first mode or the second mode.

31. The user interface as in claim 29 wherein the user input comprises resizing a window.

32. The user interface as in claim 29 wherein the multiple attributes further comprises a list of different font attributes.

33. The user interface as in claim 32 wherein the selected font attribute is one of font size, boldness, italic angle, baseline offset, line spacing and character spacing.

34. The user interface as in claim 29 wherein the representation of the command is one of: a combination box, a pop-up menu, and a selection list.

35. A method to determine a parameter, the method comprising:
    displaying a user interface in a first mode in which a representation of a command is displayed, the representation of the command which when activated causes displaying of a list from which a parameter is selected;
    receiving an input to switch from either a first mode to a second mode or to switch from the second mode to the first mode;
    displaying a user interface in a second mode in which a slider replaces the list displayed in the first mode, wherein the slider is displayed with a unitary thumb having a position along the slider between a maximum and a minimum parameter, at least one of the maximum and the minimum parameter is updated when a first input is received, the thumb being movable relative to the maximum and the minimum parameter on the slider and the position of the thumb determining a selection of a parameter from the list and displaying a label corresponding to the minimum or the maximum value for the slider.

36. The method as in claim 35 wherein the input to switch comprises resizing a window.

37. The method as in claim 35 wherein the list further comprises one of a font attribute.

38. The method as in claim 37 wherein the font attribute is one of: font size, boldness, italic angle, baseline offset, line spacing and character spacing.

39. The method as in claim 35 wherein the representation of the command is one of: a combination box, a pop-up menu, and a selection list.

40. A machine implemented method to determine a parameter, the method comprising:
    displaying a user interface in a first mode in which a representation of a command is displayed, the representation of the command, when activated, causing the display of a list from which a parameter is selected;
    receiving an input to switch from either the first mode to a second mode or to switch from the second mode to the first mode;
    displaying a user interface in a second mode in which a slider replaces the list displayed in the first mode, wherein the slider is displayed with a unitary thumb having a position along the slider between a maximum and a minimum parameter, determining a minimum and maximum parameter of the list of parameters for the slider in response to user input the position of the thumb determining a selection of a parameter from the list, wherein a set of parameters of the list represented by the slider in the second mode is same as the list displayed in the first mode and displaying a label corresponding to the minimum or the maximum value for the slider.

41. The machine implemented method as in claim 40 wherein the input to switch comprises resizing a window.

42. The machine implemented method as in claim 40 wherein the list further comprises one of a font attribute.

43. The machine implemented method as in claim 42 wherein the font attribute is one of: font size, boldness, italic angle, baseline offset, line spacing and character spacing.

44. The machine implemented method as in claim 40 wherein the representation of the command is one of: a combination box, a pop-up menu, and a selection list.

45. A machine readable medium containing executable computer program instructions which when executed by a data processing system cause the system to perform a method comprising:
    displaying a user interface in a first mode in which a representation of a command is displayed, the representation of the command, when activated, causing the display of a list from which a parameter is selected;
    receiving an input to switch from either the first mode to a second mode or to switch from the second mode to the first mode;

displaying a user interface in a second mode in which a slider replaces the list displayed in the first mode, wherein the slider is displayed with a unitary thumb having a position along the slider between a maximum and a minimum parameter, the thumb being movable relative to the slider in response to a user input and the position of the thumb determining a selection of a parameter from the list determining a minimum and maximum parameter of the list of parameters for the slider in response to user input, and displaying a label corresponding to the minimum or maximum parameter for the slider.

46. The medium as in claim 45 wherein the input to switch comprises resizing a window.

47. The medium as in claim 45 wherein the list further comprises one of a font attribute.

48. The medium as in claim 45 wherein the font attribute is one of: font size, boldness, italic angle, baseline offset, line spacing and character spacing.

49. The medium as in claim 45 wherein the representation of the command is one of: a combination box, a pop-up menu, and a selection list.

* * * * *

UNITED STATES PATENT AND TRADEMARK OFFICE
CERTIFICATE OF CORRECTION

PATENT NO. : 7,735,020 B2  
APPLICATION NO. : 11/524623  
DATED : June 8, 2010  
INVENTOR(S) : Imran Chaudhri Page 1 of 1

It is certified that error appears in the above-identified patent and that said Letters Patent is hereby corrected as shown below:

On page 2, in column 2, under "Other Publications", line 6, delete "Miscrosoft" and insert -- Microsoft --, therefor.

In column 10, line 2, in Claim 17, delete "replaces," and insert -- replaces --, therefor.

In column 11, line 57, in Claim 33, delete "of" and insert -- of: --, therefor.

In column 12, line 41, in Claim 40, delete "input" and insert -- input, --, therefor.

In column 13, line 8, in Claim 45, delete "list" and insert -- list; --, therefor.

In column 14, line 5, in Claim 48, delete "claim 45" and insert -- claim 47 --, therefor.

Signed and Sealed this  
Fifteenth Day of November, 2011

David J. Kappos  
*Director of the United States Patent and Trademark Office*